(12) United States Patent
Keller (10) Patent No.: US 11,535,325 B2
(45) Date of Patent: Dec. 27, 2022

(54) MOTORCYCLE LIGHT FOR REALIZING AT LEAST ONE LIGHT FUNCTION

(71) Applicant: motogadget GmbH, Berlin (DE)

(72) Inventor: Garrit Keller, Berlin (DE)

(73) Assignee: MOTOGADGET GMBH, Berlin (DE)

( * ) Notice: Subject to any disclaimer, the term of this patent is extended or adjusted under 35 U.S.C. 154(b) by 0 days.

(21) Appl. No.: 17/341,713

(22) Filed: Jun. 8, 2021

(65) Prior Publication Data

US 2021/0403112 A1 Dec. 30, 2021

(30) Foreign Application Priority Data

Jun. 26, 2020 (DE) ........................ 10 2020 003849.2

(51) Int. Cl.
*B62J 6/055* (2020.01)
*B62J 6/045* (2020.01)
(Continued)

(52) U.S. Cl.
CPC .............. *B62J 6/055* (2020.02); *B62J 6/045* (2020.02); *F21V 5/04* (2013.01); *F21Y 2113/13* (2016.08); *F21Y 2115/10* (2016.08)

(58) Field of Classification Search
CPC ............. B62J 6/045; B62J 6/055; B60Q 1/38; F21V 5/04
See application file for complete search history.

(56) References Cited

U.S. PATENT DOCUMENTS

D836,804 S * 12/2018 Zylinski .................... D26/28
2009/0185388 A1 7/2009 Kageyama
2013/0322107 A1* 12/2013 Kuo ..................... B60Q 1/2657
362/546

(Continued)

FOREIGN PATENT DOCUMENTS

DE 10 2009 010572 A1 10/2010
DE 10 2004 064204 A1 3/2012
(Continued)

OTHER PUBLICATIONS

Gleich, Light for a vehicle, Mar. 8, 2012, DE102004064204A1, Google Patent https://patents.google.com/patent/DE102004064204A1/en?oq=de+102004064204 (Year: 2012).*
(Continued)

*Primary Examiner* — Rajarshi Chakraborty
*Assistant Examiner* — Michael Chiang
(74) *Attorney, Agent, or Firm* — Ware, Fressola, Maguire & Barber LLP (57) ABSTRACT

The invention relates to a motorcycle lamp (2) for implementing at least one lamp function. The motorcycle lamp (2) comprises
 a housing (4) having a light-emission aperture (6),
 a bracket (8) mounted on the housing (4) for securing the motorcycle lamp (2) to a motorcycle,
 at least one light source (10) disposed in the housing (4) and
 a front optics (12) made of a solid transparent material disposed between the at least one light source (10) and the light-emission aperture (6),
  wherein the at least one light source (10) comprises an LED and is disposed and oriented in the housing (4) such that it emits light in a main radiation direction (14) extending through the light-emission aperture (6), and
  wherein the front optics (12) closes the light-emission aperture (6) and deflects and shapes the light emitted by the at least one light source (10) to generate a light distribution corresponding to a lamp function implemented by the motorcycle lamp (2). In order for the lamp (2) to improve the lateral perceptibility without the use of additional optical elements in the optical path, it is proposed that a light-emission surface (16) of the front optics (12) has a first convex curvature
(Continued)

when viewed in a horizontal plane (yz) and a second convex curvature when viewed in a vertical plane (xz), the latter being smaller than the first convex curvature in the horizontal plane (yz) or flat.

20 Claims, 5 Drawing Sheets

(51) Int. Cl.
*F21V 5/04* (2006.01)
*F21Y 113/13* (2016.01)
*F21Y 115/10* (2016.01)

(56) References Cited

U.S. PATENT DOCUMENTS

| | | | |
|---|---|---|---|
| 2014/0016336 A1* | 1/2014 | Takenaka | B60Q 1/38 362/473 |
| 2015/0241022 A1 | 8/2015 | Huang | |
| 2016/0318568 A1* | 11/2016 | Hosoda | F21S 43/14 |
| 2017/0254500 A1* | 9/2017 | Leugers | F21S 43/241 |
| 2021/0001942 A1* | 1/2021 | Yamada | F21S 43/247 |

FOREIGN PATENT DOCUMENTS

| | | | |
|---|---|---|---|
| DE | 102004064204 A1 * | 3/2012 | B62J 6/005 |
| DE | 11 2017 004 088 A5 | 5/2019 | |
| DE | 10 2012 214 138 B4 | 1/2021 | |
| EP | 2 693 104 A1 | 2/2014 | |
| JP | 2006 111153 A | 4/2006 | |

OTHER PUBLICATIONS

English language Abstract of DE102009010572A1.
English language Abstract of DE102004064204A1.
English language Abstract of JP2006111153A.

* cited by examiner

MOTORCYCLE LIGHT FOR REALIZING AT LEAST ONE LIGHT FUNCTION

BACKGROUND OF THE INVENTION

1. Field of Invention

This invention relates to a motorcycle lamp for implementing at least one lamp function. The motorcycle lamp includes
a housing having a light-emission aperture,
a bracket mounted on the housing for securing the motorcycle lamp on a motorcycle,
at least one light source disposed in the housing and
a front optics made of a solid transparent material disposed between the at least one light source and the light-emission aperture,
wherein the at least one light source comprises an LED and is disposed and oriented in the housing such that it emits light in a main radiation direction extending through the light-emission aperture, and
wherein the front optics closes the light-emission aperture and deflects and shapes the light emitted by the at least one light source to generate a light distribution corresponding to a lamp function implemented by the motorcycle lamp.

2. Description of Related Art

Motorcycle lamps are known from the state of the art in various embodiments. These can be designed to generate one or more lamp functions. In particular, the lamps may generate one or more of the lamp functions listed below: flashing light, marker light, daytime running light, bend lighting, taillight and/or brake light.

From DE 11 2017 004 088 A5 a motorcycle lamp of the type described above is known. The known lamp comprises a housing having a light-emission aperture and a bracket attached to the housing for mounting the motorcycle lamp on a motorcycle. A single light source is disposed in the housing, which can be designed as an LED. The LED is disposed and aligned in the housing such that it emits light in a main radiation direction extending through the light-emission aperture. An emitting body having a reflector, which deflects light emitted laterally from the main emission direction of the LED in the direction of the main emission direction, is located between the light source and the light-emission aperture. The radiating body can be formed as a front optic made of a solid transparent material, wherein the reflecting surfaces of the reflector are formed by totally reflecting lateral interfaces of the front optic. The front optics closes the light-emission aperture and deflects and shapes the light emitted from the LED to generate a light distribution of the lamp function implemented by the motorcycle lamp.

Additional optical elements are disposed in the optical path on the light-emission surface of the front optics of the known lamp to deflect the light passing through the front optics in specific directions. This is intended in particular to fulfill the legal requirements for lateral visibility or perceptibility of the lamp and its lamp function. ECE regulation 48, for instance, stipulates the values listed below for the lateral perceptibility of a lamp:
direction-indicator lamp: horizontal: 45° inwards and 80° outwards; vertical: +/−15° upwards and downwards (ECE-R. 48 para. 6.5.5);
marker lamp: horizontal: 45° inwards and 80° outwards; vertical: +/−15° (ECE-R. 48 para. 6.9.5);
daytime running lamps: horizontal: +/−20°; vertical: +/−10° (ECE-R. 48 para. 6.19.5);
bend lighting: horizontal: 30°-60° outwards; vertical: +/−10° (ECE-R. 48 para. 6.20.5);
rear position lamp: horizontal: 45° inwards and 80° outwards; vertical: +/−15° (ECE-R. 48 para. 6.10.5);
stop lamp: horizontal: +/−45°; vertical: +/−15° (ECE-R. 48 para. 6.7.5); and
dipped-beam: horizontal +/−30°; vertical: +/−10° (ECE-R. 48 para. 6.16.5).

Corresponding or similar values for lateral visibility are also provided for in the standards applicable in other countries outside the EU, e.g. United Nations Regulation No. 48 or SAE (Society of Automotive Engineers, Inc.) and FMVSS (Federal Motor Vehicle Safety Standards) 108 in the U.S. or the CMVSS (Canada Motor Vehicle Safety Standards) in Canada. With the known lamp, these values can only be achieved with the help of the additional optical elements on the light-emission surface of the front optics. The optical elements are, for instance, prisms or cylindrical lenses. The disadvantage of the optical elements is that the light-emission surface of the front optics is not smooth, i.e., dirt, insects or the like can easily stick. In addition, the protruding optical elements render the light-emission surface is difficult to clean. This disadvantage is exacerbated by the fact that edges form at the transition between the light-emission surface of the front optics and the optical elements, in which edges dirt and insects can adhere in a particularly persistent manner.

SUMMARY OF THE INVENTION

Based on the described prior art, this invention addresses the problem of designing and developing a motorcycle lamp of the type mentioned at the beginning such that the requirements for lateral visibility or perceptibility of the lamp or the lamp function generated thereby can also be met without optical elements on the light-emission surface of the front optics.

To solve this problem, a new and unique motorcycle lamp is proposed. In particular, based on the motorcycle lamp of the type mentioned at the beginning, it is proposed that a light-emission surface of the front optics has a first convex curvature when viewed in a horizontal plane, extending through the light source or one of the light sources and comprising the main emission direction of the light source, and has a second convex curvature, which is smaller than the first convex curvature in the horizontal plane or is flat, when viewed in a vertical plane, extending through the light source or one of the light sources and comprises the main emission direction of the light source.

The lamp is preferably mounted laterally on a motorcycle. The bracket for mounting the lamp preferably comprises a threaded rod onto which a nut can be installed. Preferably, the bracket is integrally formed with the housing of the lamp, e.g. milled from a metal part (e.g. aluminum). A part of the motorcycle can be clamped between the nut and the housing of the lamp or a similar stop of the lamp, in that way securing the lamp to the motorcycle. Alternatively, it would also be conceivable to dispose an elastically deformable hollow-cylindrical retaining element between the nut and the housing or a stop of the lamp, the inner cavity of which holds the threaded rod.

Tightening the nut compresses and deforms the retaining element, in particular bulging it outwards thereby increasing its perimeter. From the inside, the deformed retaining element presses against a tubular mount of the motorcycle, for instance a handlebar, into which the bracket of the lamp with the retaining element was inserted before the nut was tightened, such that the light is clamped to the mount and thus also to the motorcycle after the nut is tightened.

When the lamp is properly mounted on the motorcycle, the main beam direction of the light source is preferably in the direction of travel (for a front lamp mounted on a front part of the motorcycle) or opposite to the direction of travel of the motorcycle (for a rear lamp mounted at a rear area of the motorcycle). The horizontal plane of the light comprises the main beam direction of the light source and is oriented perpendicular to a vertical longitudinal plane of the motorcycle when the lamp is mounted on the motorcycle. The longitudinal plane of the motorcycle extends through the two wheels of the motorcycle and perpendicular to the axes of rotation of the wheels.

The curvature of the light-emission surface in the horizontal plane and—if desired—also in the vertical plane ensures a widening or scattering of the emerging light beam in the corresponding plane. The dispersion is more pronounced in the horizontal direction than in the vertical direction. The scattering of the emitted light in the horizontal plane provides an improved lateral visibility or geometric visibility of the lamp, which as a minimum fulfills the legal requirements.

A light source designed as an LED emits light in a main radiation direction and in a half-space around the main radiation direction preferably covering 180°. The light emitted by the light source enters the front optics through a light-entrance area. Preferably, the light-entrance area comprises a recess such that a light-entrance surface, which extends approximately perpendicular to the main radiation direction of the light source, is formed at the bottom of the recess and a light entrance collar, which extends approximately in parallel to the main radiation direction of the light source, is formed at the edge of the recess. The light beams emitted in the main radiation direction and a small angle area (e.g. +/−30°) around the main radiation direction enter the front optics through the light-entrance surface and leave it again—usually without reflections—through the light-emission surface. The light rays are refracted according to the general laws of optics when entering and exiting the front optics. Thus, the light passing through the front optics can be shaped and deflected in a desired manner by selectively shaping the light-entrance surfaces and light-emission surfaces. In particular, it is conceivable to make the light-entrance surface and/or the light-emission surface flat or curved. The curvature of the light-emission surface is convex, at least in the horizontal plane. The light-entrance surface can be convex or concave or flat. In addition, it is conceivable to slant the light-entrance area with respect to the main radiation direction when viewed in the horizontal plane.

The light rays emitted in a larger angle range (e.g. >30°) around the main radiation direction enter the front optics through the light entrance collar and exit it again—possibly after reflection at a lateral totally reflecting interface of the front optics—through the light-emission surface. Depending on the design of the front optics, there may be no reflection of the light rays entering the front optics laterally. For instance, reflection can be eliminated by slanting the light entrance collar and/or by flattening the lateral total-reflective interface of the front optics. Furthermore, in the case where the light rays are totally reflected at the interfaces of the front optics, the shape of the interfaces can be deliberately varied to shape and deflect the light passing through the front optics in a desired manner.

If the motorcycle lamp has more than one light source, a single joint front optics provides the desired deflection and shaping of the light passing through the light sources to achieve the desired lamp function. Preferably, the front optics is designed such that the light emitted by different light sources and coupled into the front optics serves to generate different luminous functions after exiting the front optics. In particular, it is proposed that the front optics have a separate light-entrance area for every light source. The light-entrance areas can be designed in different ways. For instance, the light-entrance surfaces of the various light-entrance areas can have different distances from the light-emitting surfaces of the light sources respectively assigned thereto. Furthermore, it is conceivable that the light entrance collars of the various light-entrance areas do not extend across the entire perimeter of the associated recesses, but only across part of the perimeter of the recess. The light entrance collars of the various light-entrance areas may be contiguous and complementary to form a single light entrance collar that encompasses the periphery of all light sources of the lamp. It is also conceivable that the individual light sources are assigned to converging lenses such that the light emitted by the light sources is first bundled before it falls on the assigned light-entrance areas of the front optics. In this way, it can be achieved that at least approximately all the light emitted by the light sources enters the front optics through the respective assigned light-entrance surfaces (and not through the light entrance collars).

Preferably, the curvature is selected such that a lateral perceptibility of at least 10° is achieved inwards in the horizontal direction (towards the motorcycle to which the lamp is attached) and at least 45° is achieved outwards (away from the motorcycle to which the light is attached). In the vertical direction, the upwards and downwards curvature preferably achieves a visibility of at least +/−5°. Particularly preferably, the lamp is designed depending on the lamp function it generates, in particular the light-emission surface is curved such that the legal requirements for the lateral visibility of the corresponding lamp function can be met without additional optical elements in the optical path, in particular on the light-emission surface of the front optics.

According to an advantageous further development of this invention, it is proposed to slant the light-emission surface of the front optics with respect to a plane perpendicular to the main emission direction of the light source(s), viewed in the horizontal plane. Preferably, the light-emission surface of the front optics is slanted with respect to the plane perpendicular to the main emission direction of the light source(s), viewed in the horizontal plane, in a direction away from the motorcycle when the motorcycle lamp is mounted on a motorcycle.

The plane with respect to which the light-emission surface of the front optics is slanted when viewed in the horizontal plane is preferably perpendicular to both the horizontal plane and the vertical plane. A surface normal in the center of the light-emission surface is slanted sideways when viewed in the horizontal plane. This lateral slant of the light-emission surface of the front optics directs the light of the at least one light source passing through the front optics more laterally by refraction. In this way, a significantly improved lateral perceptibility of the lamp can be achieved, which at least fulfills the legal requirements or can even exceed them.

Preferably, the light-emission surface of the front optics or a surface normal in the center of the light-emission surface is directed away from the motorcycle when the motorcycle lamp is mounted on a motorcycle. The surface normal of the light-emission surface is thus directed obliquely outwards with respect to the main radiation direction of the light source(s) or with respect to the vertical longitudinal plane of the motorcycle.

To be able to achieve the required light distribution (e.g. maximum and/or minimum values and distribution of luminous intensity) for a desired lamp function despite the lateral slant of the light-emission surface, it can be advantageous to slant the light-emitting area viewed in the horizontal plane with respect to the main radiation direction of the associated light source. The slant of the light-entrance area can be in the same direction as the slant of the light-emission surface area or in a different direction. The slant of the light-entrance area can result in the light-entrance surface not being perpendicular to the main radiation direction of the associated light source and/or in partial areas of the light entrance collar being slanted by different degrees with respect to the main radiation direction. Overall, the slant of the light-emission surface and/or the slant of the light-entrance area of the front optics results in an asymmetrical design of the front optics with respect to the main radiation direction of the assigned light source.

It is proposed to mount the bracket laterally on the housing viewed in the horizontal plane, and to slant the light-emission surface of the front optics or a surface normal at the center of the light-emission surface away from the bracket viewed in the horizontal plane.

According to another advantageous further development of the invention, it is proposed that the housing has side walls laterally delimiting the housing and the light-emission aperture, that the bracket is laterally mounted on the housing viewed in the horizontal plane, and that a side wall facing away from the bracket or a part of a side wall facing away from the bracket has a lower height than an opposite side wall or an opposite part of a side wall. When a motorcycle lamp is mounted on a motorcycle, a side wall facing away from the motorcycle or a part of a side wall facing away from the motorcycle has a lower height than an opposite side wall or part of a side wall.

If the motorcycle lamp has several light sources, these are preferably used to implement several different lamp functions. Preferably, at least one of the light sources is used to implement one of the lamp functions. The different lamp functions of the motorcycle lamp advantageously include a flashing light and a marker lamp or a taillight and a brake light or a flashing light, a taillight and a brake light. Preferably, at least two of the light sources emit light of different colors. These different colors emitted by the light sources of a lamp are, for instance, white and yellow or red and yellow. When multiple light sources are provided, it is suggested that a joint front optics is disposed between all the light sources and the light-emission aperture, and the front optics deflects and shapes the light emitted from the light sources to generate the light distributions of the various lamp functions. Preferably, each of the light sources is assigned its own separate light-entrance area of the front optics. However, it is conceivable that partial areas of the front optics (e.g. the light-emission surface) are used equally by light beams emitted by different light sources and used to generate different lamp functions.

It is conceivable that the light-emission surface of the front optics projects outwards beyond the light-emission aperture when the light-emission aperture is closed by the front optics. This results in a transparent collar around the light-emission surface, which is preferably aligned in parallel to the main emission direction of the at least one light source. The collar may be formed higher on the end of the lamp facing away from the bracket than on the opposite end facing the bracket. The light emitted by the at least one light source and focused by the front optics can emerge laterally through the transparent collar of the front optics, further improving the lateral visibility of the lamp. The transparent collar of the front optics is preferably flush with the adjacent wall sections of the lamp housing.

According to a preferred embodiment of the invention, however, it is proposed that the light-emission surface of the front optics be flush with a rim of the housing delimiting the light-emission aperture when the light-emission aperture is closed by the front optics. I.e., the light-emission surface of the front optics thus merges into the housing of the lamp without any shoulders or edges. The light-emission surface does not protrude beyond the rim of the housing delimiting the light-emission aperture.

To use the front optics to close the light-emission aperture, the front optics are preferably disposed in or on the light-emission aperture and mounted on the housing. It can be attached, for instance, by means of screws, a snap-on fastener, a thread, gluing or welding. A seal may be provided between the rim of the light-emission aperture and the front optics. Preferably, the front optics is bonded inside the light-emission aperture, wherein the adhesive can simultaneously be used as a seal between the front optics and the rim of the light-emission aperture of the housing. Preferably, a combination of sealant and adhesive is used. Particularly preferably, the adhesive used comprises an MS polymer (modified silanes). The adhesive is also used to compensate for manufacturing tolerances of the front optics and/or the housing to always ensure the same high-precision positioning of the front optics on the light-emission aperture.

According to a further advantageous further development of the invention, it is proposed that the housing has a circumferential rim delimiting the light-emission aperture, that the front optics has a circumferential collar projecting radially outwards, and the rim and the collar have bearing surfaces facing each other, which are used to mount the front optics on the housing. The rim delimiting the light-emission aperture is preferably an upper rim of the side walls of the housing. The bearing surface of the front optics is located on a bottom end of the collar, and the bearing surface of the housing is located on a top end of the rim. The collar of the front optics is set on the rim of the housing and mounted thereon. In this case, a large part of the front optics extends through the light-emission aperture into the interior of the housing.

According to a preferred embodiment, it is proposed that the bearing surfaces of the circumferential rim of the housing and of the circumferential collar of the front optics are beveled to complement each other, i.e., the bearing surface of the circumferential rim has a cone-like shape and the circumferential collar tapers outwards.

It is further proposed that the at least one light source is disposed on a printed circuit board and is electrically contacted through the latter, and that the end of the printed circuit board facing away from the at least one light source rests on a support area of the housing in a direction in parallel to the main radiation direction of the at least one light source and is mounted in the housing. The printed circuit board is thus positioned with high precision in the z-direction in relation to the housing. The printed circuit board can be mounted on the housing using screws, a snap-on fastener, a thread, gluing or welding. Preferably, an adhesive is used, in particular a thermoconducting adhesive, to transfer the waste heat generated during the operation of the at least one light source to the housing as efficiently as possible. The housing also serves as a heat sink or heat dissipator for the at least one light source and—if present—other electrical components disposed on the circuit board. Preferably, the printed circuit board and—if present—the other electrical components disposed on the printed circuit board are encapsulated by the adhesive. Particularly preferably, a cavity between an underside of the printed circuit board and the housing is filled with the adhesive.

Finally, according to an advantageous further development of the invention, it is proposed that locking pins engaging in corresponding locking holes are used to position the front optics in a plane perpendicular to the main radiation direction of the at least one light source. The front optics is thus positioned with high precision in the xy plane in relation to the housing. This the housing ensures highly accurate positioning of the front optics in relation to the light sources mounted on the PCB.

With the motorbike signal lamp according to the invention properly mounted to the motorbike in an operational condition, the horizontal plane extends essentially in a straight driving direction of the motorbike. The vertical plane also extends essentially in the straight driving direction of the motorbike, but perpendicular to the horizontal plane. The invention allows to significantly increase the lateral visibility of the signal light without additional optically effective elements (e.g., cylindrical lenses, prisms, or the like) on the light emitting surface of the motorbike signal lamp. In particular, the special design of the motorbike lamp widens the emitted light bundles relatively strongly in the horizontal plane and only slightly or not at all in the vertical plane.

If the motorbike signal lamp has more than one light source, the main emission directions of these light sources preferably extend parallel to each other and further preferably essentially in the straight driving direction of the motorbike. This has the advantage that all light sources can be mounted and electrically contacted on a common flat PCB. This saves space inside the housing and allows the design of a particularly small motorbike signal light.

If the motorbike signal lamp has more than one light source, preferably there is a single common primary optics for more than one light source, in particular for all light sources. The primary optics forms the light distribution of the motorbike signal light function without further light forming optics, e.g., a secondary optics like a reflector or an optical lens, arranged in the light path of the light beams exiting the light emitting surface of the primary optics.

If the motorbike signal lamp has more than one light source, one or more of the light sources can produce a signal light function. One or more of the light sources can contribute to more than one signal light function, e.g., one or more light sources can emit light for a rear (tail) light as well as for a brake light or one or more light sources can emit light for a daytime running light and for a position light. If a light source emits light for more than one signal light function, the intensity of the light emitted by the light source can be varied from light function to light function, e.g., the light for a brake light or a position light has a higher intensity than the light for a rear light or a position light. Preferably, the common primary optics handles the formation of the light distributions even if the motorbike signal lamp is adapted to produce two or more different signal light functions.

BRIEF DESCRIPTION OF THE FIGURES IN THE DRAWING

Further features and advantages of this invention are explained in more detail below on the basis of the Figures. In this context, the individual features of the motorcycle lamp shown in the figures can also each be essential features of the invention on their own, even if this is not expressly mentioned in the description. Furthermore, the features of the motorcycle lamp shown in the various figures can also be combined in any way, even if this combination is not explicitly mentioned in the description. In the Figures.

DETAILED DESCRIPTION OF THE BEST MODE OF THE INVENTION

The motorcycle lamp according to the invention of FIGS. 1-4 is designated in its entirety by the reference numeral 2. It is used to implement at least one lamp function, e.g. flashing light, marker light, bend lighting, taillight and/or brake light. The motorcycle lamp 2 comprises
  a housing 4 having a light-emission aperture 6 (cf. FIG. 4),
  a bracket 8 mounted on the housing 4 for securing the motorcycle lamp 2 to a motorcycle,
  at least one light source 10 disposed in the housing 4 (cf. FIG. 4), and
  a front optics 12 made of a solid transparent material, such as glass or plastic, disposed between the at least one light source 10 and the light-emission aperture 6. The at least one light source 10 comprises an LED or any other semiconductor light source (e.g. OLED, laser LED) and is disposed and aligned in the housing 4 such that it emits light in a main radiation direction 14 (cf. FIG. 4) extending through the light-emission aperture 6. The front optics 12 closes the light-emission aperture 6 and deflects and shapes the light emitted from the at least one light source 10 to generate a light distribution corresponding to the lighting function implemented by the motorcycle lamp 2.

In order for the motorcycle lamp 2 to fulfill the requirements for lateral visibility or perceptibility of the lamp 2 or the lighting function it generates without additional optical elements in the optical path, for instance on a light-emission surface 16 of the front optics 12, it is proposed that the light-emission surface 16 of the front optics 2 has a first convex curvature, when viewed in a horizontal plane (cf. FIGS. 2 and 4), extending through the light source 10 or one of the light sources 10 and comprising the main radiation direction 14 of the light source 10, and has a second convex curvature which is smaller than the first convex curvature in the horizontal plane, or is flat, when viewed in a vertical plane (cf. FIG. 3) extending through the light source 10 or one of the light sources 10 and comprising the main radiation direction 14 of the light source 10. The horizontal plane corresponds to the yz-plane, the vertical plane corresponds to the xz-plane.

The lamp 2 is preferably laterally mounted on a motorcycle. The bracket 8 for securing the lamp 2 preferably comprises a threaded rod 18 onto which a nut (not shown) can be screwed. Preferably, the bracket 8 is formed integrally with the housing 4 of the lamp 2, for instance milled in conjunction with the housing 4 from a joint metal part (e.g. aluminum) or manufactured by means of die casting. Alternatively, the housing 4 and the bracket 8 can also be made of plastic, for instance by means of injection molding. A part of the motorcycle, for instance a lateral fairing, can be clamped between the nut and the housing 4 of the lamp 2 or a corresponding stop of the lamp 2, and the lamp 2 can be mounted on the motorcycle in that way. With the motorcycle lamp 2 mounted on the motorcycle, only the housing 4 and the front optics 12 are visible from the outside.

Alternatively, it would also be conceivable to arrange an elastically deformable hollow-cylindrical retaining element (not shown) between the nut and the housing 4 or a stop of the lamp 2, through the inner cavity of which the threaded rod 18 is guided. Tightening the nut compresses and deforms the retaining element, in particular bulging it outwards thereby increasing its perimeter. From the inside, the deformed retaining element presses against a tubular mount of the motorcycle, for instance a handlebar, into which the bracket 8 of the lamp 2 with the retaining element was inserted before the nut was tightened, such that the lamp 2 is clamped to the mount and thus also to the motorcycle after the nut is tightened.

When the lamp 2 is properly mounted on the motorcycle, the main beam direction 14 of the light source is preferably in the direction of travel (for a front lamp 2 mounted on a front part of the motorcycle) or opposite to the direction of travel of the motorcycle (for a rear lamp 2 mounted at a rear area of the motorcycle). The horizontal plane of the lamp comprises the main beam direction 14 of the light source 10 and is oriented perpendicular to a vertical longitudinal plane of the motorcycle when the lamp 2 is mounted on the motorcycle. The longitudinal plane of the motorcycle extends through the two wheels of the motorcycle and perpendicular to the axes of rotation of the wheels.

Figure 1:
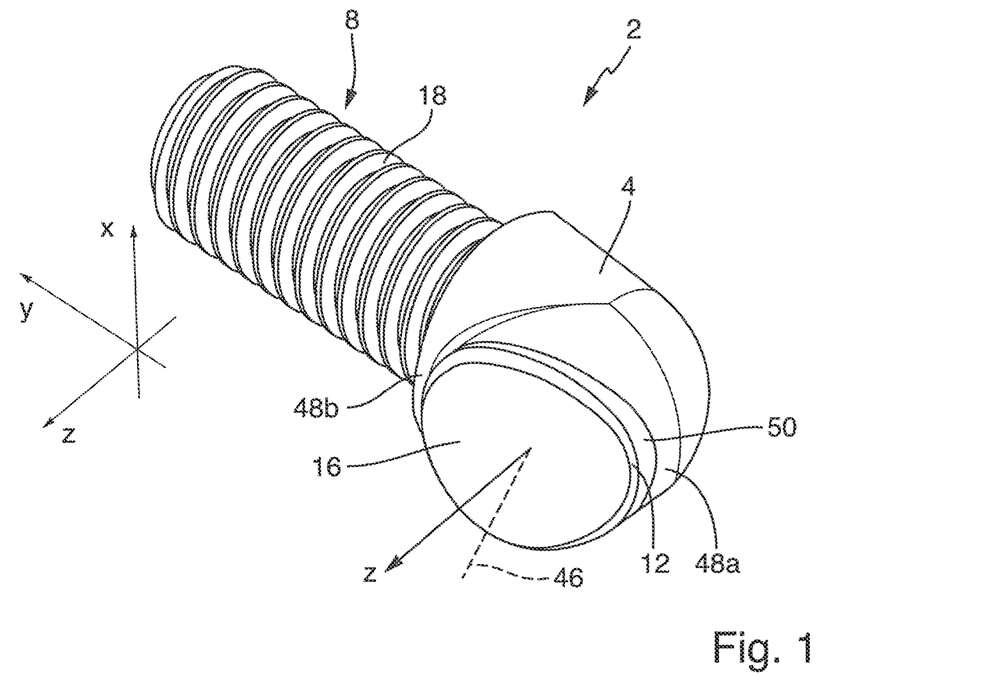
FIG. 1 shows a perspective view of a first embodiment of a motorcycle lamp according to the invention.
Figure 2:
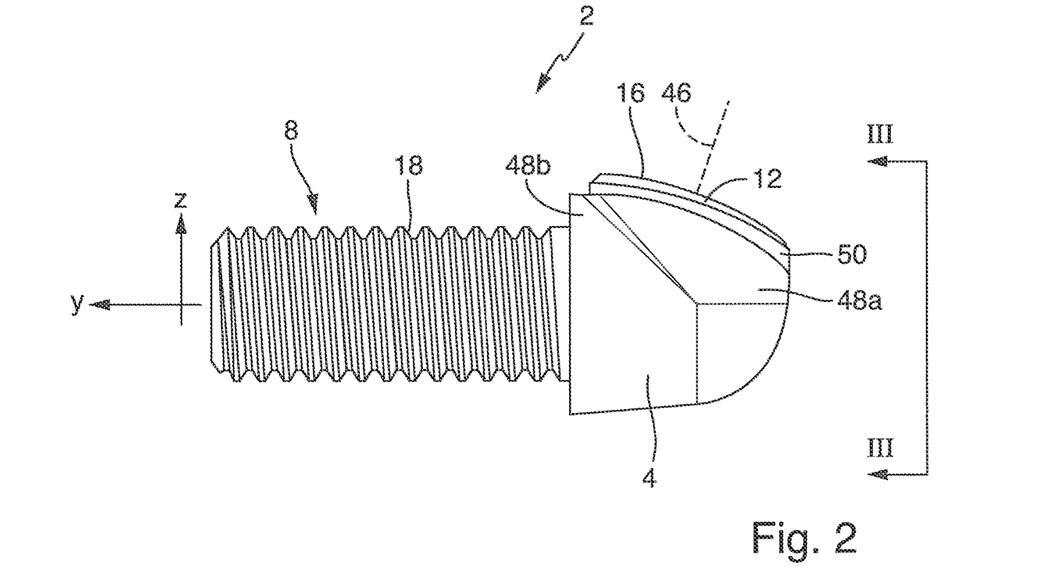
FIG. 2 shows a top view of the motorcycle lamp of FIG. 1.
Figure 3:
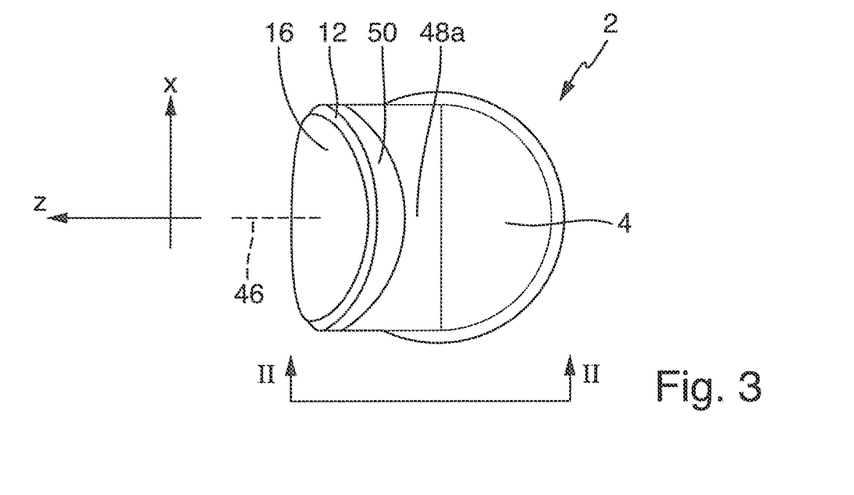
FIG. 3 shows a side view of the motorcycle lamp of FIG. 1.
Figure 4:
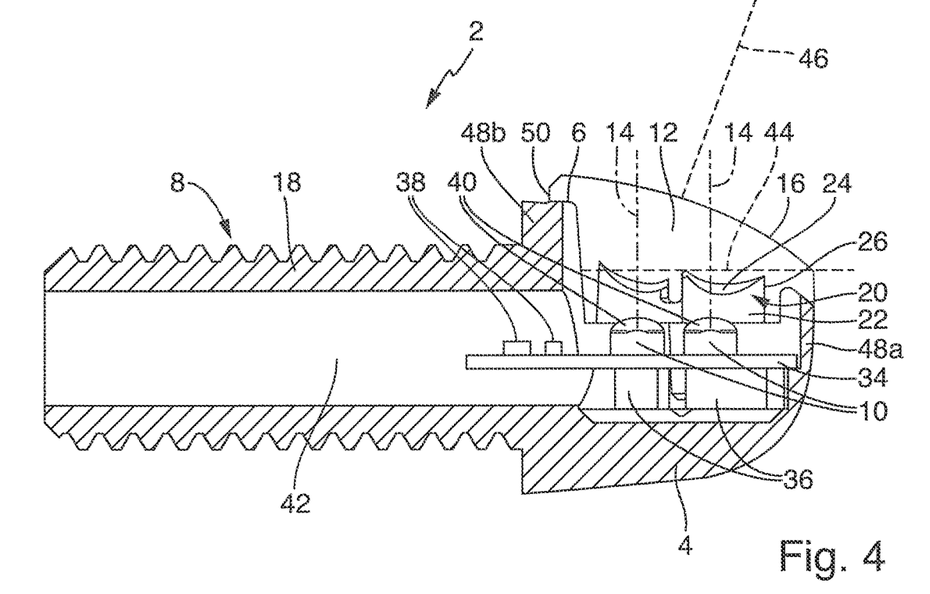
FIG. 4 shows a sectional view of the motorcycle lamp of FIG. 1 in a horizontal plane.

Based on FIGS. 2-4, it can be seen that the curvature in the horizontal plane (cf. FIGS. 2 and 4) is more pronounced than a curvature in the vertical plane (see FIG. 3). In the example shown, the curvature in the vertical plane is virtually zero, such that the light-emission surface 16 is mainly flat when viewed in the vertical plane. Only at the outer rim of the light-emission surface 16 there is a slight curvature visible in the vertical plane. During the operation of the lamp 2, however, practically no light passes through this periphery, such that this slight curvature in the edge areas has virtually no influence on the resulting lamp function or its light distribution.

The curvature of the light-emission surface 16 in the horizontal plane and—if present also—in the vertical plane ensures that the light beam emerging from the lamp 2 is widened or diffused in the corresponding plane. The dispersion is greater in the horizontal plane than in the vertical plane. The scattering of the emitted light in the horizontal plane provides an improved lateral visibility or geometric visibility of the lamp 2 for other road users, which as a minimum fulfills the legal requirements. ECE regulation 48, for instance, stipulates the values for the lateral perceptibility of a lamp 2 listed below—depending on the lamp function:

direction-indicator lamp: horizontal: 45° inwards and 80° outwards; vertical: +/−15° upwards and downwards (ECE-R. 48 § 6.5.5);

marker lamp: horizontal: 45° inwards and 80° outwards; vertical: +/−15° (ECE-R. 48 para. 6.9.5);

daytime running lamps: horizontal: +/−20°; vertical: +/−10° (ECE-R. 48 para. 6.19.5);

bend lighting: horizontal: 30°-60° outwards; vertical: +/−10° (ECE-R. 48 para. 6.20.5);

rear position lamp: horizontal: 45° inwards and 80° outwards; vertical: +/−15° (ECE-R. 48 para. 6.10.5);

stop lamp: horizontal: +/−45°; vertical: +/−15° (ECE-R. 48 para. 6.7.5); and dipped-beam: horizontal +/−30°; vertical: +/−10° (ECE-R. 48 para. 6.16.5).

Preferably, the curvature of the light-emission surface 16 is selected such that a lateral perceptibility of at least 10° is achieved inwards in the horizontal plane (towards the motorcycle on which the lamp 2 is mounted) and at least 45° is achieved outwards (away from the motorcycle on which the lamp 2 is mounted). In the vertical plane, the upwards and downwards curvature preferably achieves a perceptibility of at least +/−5°. Particularly preferably, the lamp 2 is designed depending on the lamp function it generates, in particular the light-emission surface 16 is curved such that the legal requirements for the lateral perceptibility of the corresponding lamp function are fulfilled without additional optical elements in the optical path, in particular on the light-emission surface 16 of the front optics 12.

The bracket 8 is—as mentioned above—preferably designed as a threaded rod 18. The bracket 8 has the form of a hollow cylinder, wherein the cylindrical cavity 42 of the bracket 8 opens into the interior of the housing 4. The light sources 10 are preferably mounted on the upper end of a printed circuit board 34 and electrically connected in this way. Further electrical components 36, 38 required to operate the light sources 10 are disposed on the circuit board 34 and connected via the circuit board 34. Preferably, all electrical components 36, 38 required for the operation of the light sources 10 are disposed on the printed circuit board 34, such that the lamp 2 can be connected directly to an electrical system of the motorcycle and no additional electrical ballast is required. A part of the circuit board 34 may extend into the cavity 42 of the bracket 8. Lead cables (not shown) may be routed from the motorcycle through the cavity 42 to the circuit board 34 and connected thereto to connect the circuit board 34, electrical components 36, 38, and light sources 10 to the electrical system of the vehicle.

A light source 10 designed as an LED emits light in the main emission direction 14 and in a half-space around the main emission direction 14, preferably covering 180°. The light emitted by the light source 10 enters the front optics 4 through a light-entrance area 20. A separate light-entrance area 20 is assigned to every light source 10. The light-entrance area 20 comprises a recess 22 such that a light-entrance surface 24 that is approximately perpendicular to the main radiation direction 14 of the associated light source 10 is formed at the bottom of the recess 22 and a light entrance collar 26 that extends approximately in parallel to the main radiation direction 14 of the light source 10, is formed at the rim of the recess 22.

The light beams emitted in the main radiation direction 14 and a small angle range (e.g. +/−30°) around the main radiation direction 14 (cf. 28 in FIG. 8) enter the front optics 12 through the light-entrance surface 24 and leave it again—usually without reflections—through the light-emission surface 16. The light rays are refracted according to the general laws of optics when entering and exiting the front optics 12. Thus, the light passing through the front optics 12 can be shaped and deflected in a desired manner by selectively shaping the light-entrance surfaces 24 and light-emission surfaces 16. In particular, it is conceivable to make the light-entrance surface 24 and/or the light-emission surface 16 flat or curved. The light-entrance surface 24 can be convex or concave or flat. The curvature of the light-emission surface 16 is convex, at least in the horizontal plane. In addition, it is conceivable to slant the light-entrance area 20 in relation to the main radiation direction 14 viewed in the horizontal plane (cf. FIG. 8).

The light rays (cf. 30 in FIG. 8) emitted in a larger angle range (e.g. >30°) around the main radiation direction 14 enter the front optics 12 through the light entrance collar 26 and exit it again—possibly after reflection at a lateral totally reflecting interface 32 of the front optics 12—through the light-emission surface 16. Depending on the design of the front optics 12, there may be no reflection of the light rays 30 entering the front optics 12 laterally. For instance, reflection can be eliminated by slanting the light entrance collar 26 and/or by flattening the lateral total-reflective interface 32 of the front optics 12. Furthermore, in the case where the light rays 30 are totally reflected at the interfaces 32 of the front optics 12, the shape of the interfaces 32 can be deliberately varied to shape and deflect the light passing through the front optics 12 in a desired manner.

It is further proposed to slant the light-emission surface 16 of the front optics 12 with respect to a plane 44 perpendicular to the main emission direction 14 of the light source(s) 10, viewed in the horizontal plane (cf. FIG. 4). The plane 44 corresponds to the xy plane. Preferably, the light-emission surface 16 of the front optics 12 is slanted with respect to the plane 44 in the horizontal plane viewed in a direction away from the motorcycle when the motorcycle lamp 2 is mounted on a motorcycle.

The plane 44 with respect to which the light-emission surface 16 of the front optics 12 is slanted when viewed in the horizontal plane is preferably perpendicular to both the horizontal plane and the vertical plane. A surface normal 46 at the center of the light-emission surface 16 is slanted sideways, viewed in the horizontal plane. This lateral slant of the light-emission surface 16 of the front optics 12 directs the light of the at least one light source 10 passing through the front optics 12 more laterally by refraction. In this way, a further improved lateral perceptibility of the lamp 2 can be achieved, which at least fulfills the legal requirements or can even exceed them.

Preferably, the light-emission surface 16 of the front optics 12 or the surface normal 46 in the center of the light-emission surface 16 is directed away from the motorcycle when the motorcycle lamp 2 is mounted on a motorcycle. The surface normal 46 of the light-emission surface 16 is thus directed obliquely outwards with respect to the main radiation direction 14 of the light source(s) 10 or with respect to the vertical longitudinal plane of the motorcycle.

Figure 8:
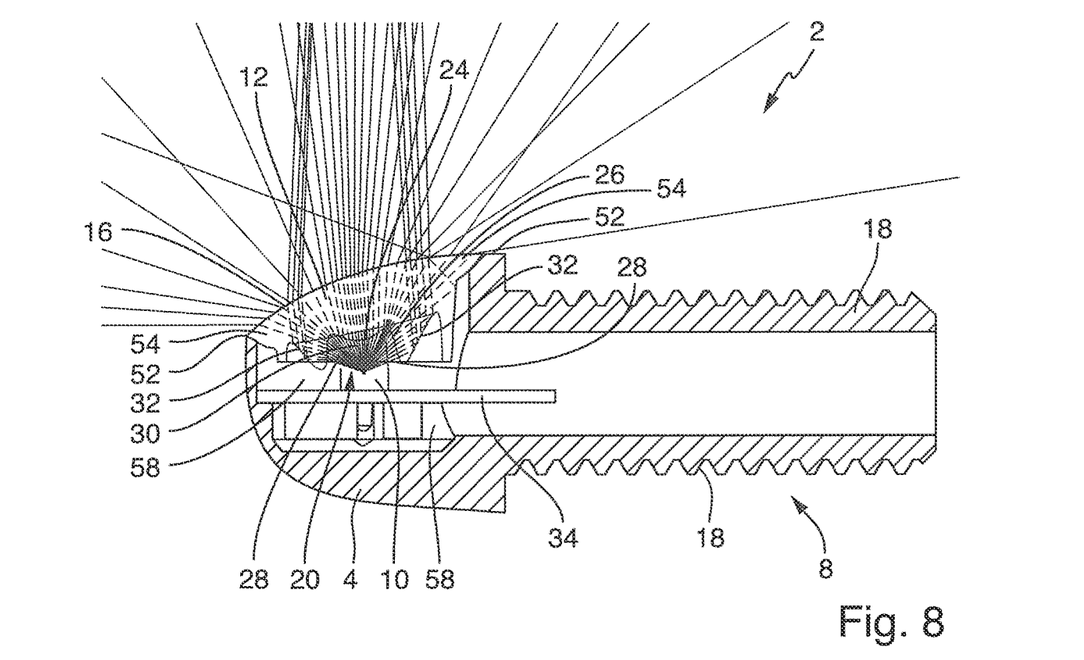
FIG. 8 shows a sectional view of the motorcycle lamp of FIG. 5 in a horizontal plane.

To be able to achieve the required light distribution (e.g. maximum and/or minimum values and distribution of luminous intensity) for a desired lamp function despite the lateral slant of the light-emission surface 16, it can be advantageous to slant the light-emitting area 20 viewed in the horizontal plane with respect to the main radiation direction 14 of the associated light source 10 (cf. FIG. 8). The light-entrance area 20 can be slanted in the same direction as the slant of the light-emission surface area 16 or in a different direction. The slant of the light-entrance area 20 can result in the light-entrance surface 24 not being perpendicular to the main radiation direction 14 of the associated light source 10 and/or in partial areas of the light entrance collar 26 being slanted by different degrees with respect to the main radiation direction 14. Overall, the slant of the light-emission surface 16 and/or the slant of the light-entrance area 20 of the front optics 12 results in an asymmetrical design of the front optics 12 with respect to the main radiation direction 14 of the assigned light source 10.

If the bracket 8 is mounted laterally on the housing 4 viewed in the horizontal plane, the light-emission surface 16 of the front optics 12 or the surface normal 46 at the center of the light-emission surface 16 is slanted away from the bracket 8 viewed in the horizontal plane.

The housing 4 may have side walls 48 (cf. FIG. 9) delimiting the light-emission aperture 6 and laterally the housing 4. A side wall 48a facing away from the bracket or a part of a side wall facing away from the bracket 8 has a lower height h_a than an opposite side wall 48b or an opposite part of a side wall having a height of h_b (h_a<h_b). When the motorcycle lamp 2 is mounted on a motorcycle, the side wall 48a facing away from the motorcycle or a part of a side wall facing away from the motorcycle has a lower height h_a than an opposite side wall 48b or an opposite part of a side wall having the height h_b.

If the motorcycle lamp 2 has several light sources 10, these are preferably used to implement several different lamp functions. Preferably, at least one of the light sources 10 is used to implement one of the lamp functions. The different lamp functions of the motorcycle lamp 2 advantageously include a flashing light and a marker lamp or a taillight and a brake light or a flashing light, a taillight and a brake light. Preferably, at least two of the light sources 10 emit light of different colors. These different colors emitted by the light sources 10 of a lamp 2 are, for instance, white and yellow or red and yellow.

When multiple light sources 10 are provided, a joint front optics 12 is preferably disposed between all light sources 10 and the light-emission aperture 6. The front optics 12 deflects and shapes the light emitted from the light sources 10 to generate the light distributions corresponding to the different lamp functions. Preferably, each of the light sources 10 is assigned its own separate light-entrance area 20 of the front optics 12. However, it is conceivable that partial areas of the front optics 12 (e.g. the light-emission surface 16) are used equally by light beams emitted by different light sources 10 and used to generate different lamp functions (cf. FIG. 9).

It is conceivable that the light-emission surface 16 of the front optics 12 projects outwards beyond the light-emission aperture 6 when the light-emission aperture is closed by the front optics 12 (cf. FIGS. 1-4). This results in a circumferential transparent peripheral surface 50 around the light-emission surface 6, which is preferably aligned in parallel to the main emission direction 14 of the at least one light source 10. When viewed in a horizontal section, the peripheral surface 50 may be formed higher on the end of the lamp 2 facing away from the bracket 8 than on the opposite end facing the bracket 8. The light emitted by the at least one light source 10 and focused by the front optics 12 can emerge laterally through the transparent peripheral surface 50 of the front optics 12, further improving the lateral visibility of the lamp 2. The peripheral surface 50 of the front optics 12 is preferably flush with the adjacent wall sections 48 of the lamp housing 4. In the exemplary embodiment of FIGS. 1-4, the outer shape of the part of the lamp 2 visible from the outside is defined for the mounted lamp 2 by the outer surfaces of the housing 4, and by the light-emission surface 16 and the circumferential peripheral surface 50 of the transparent front optics 12.

Figure 9:
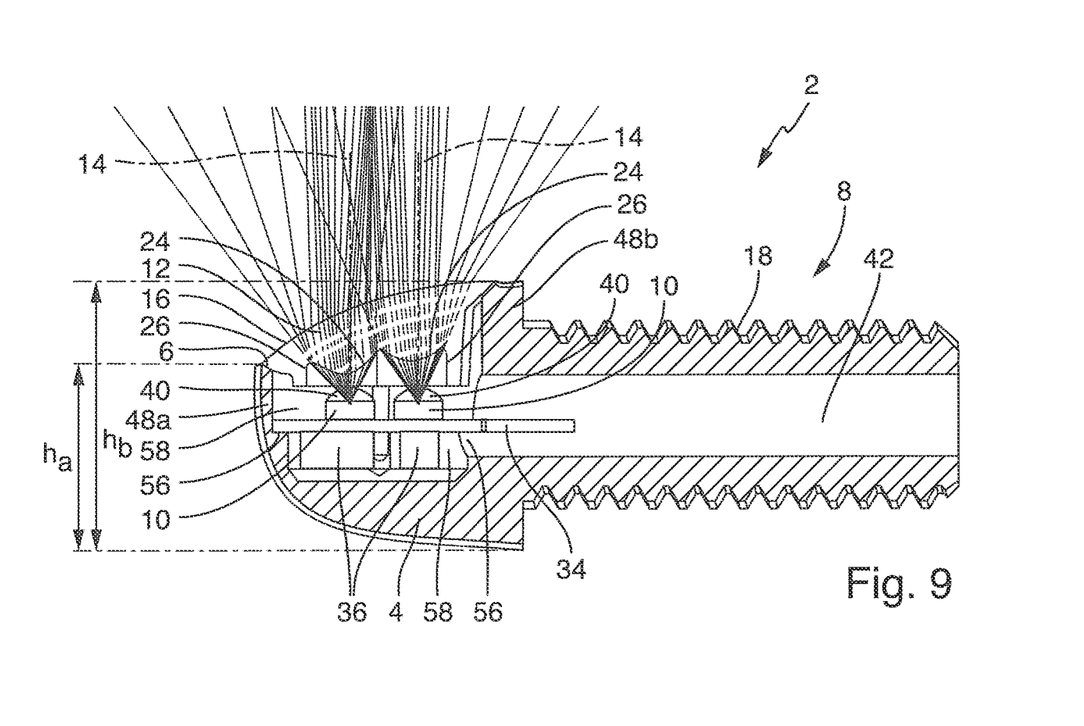
FIG. 9 shows a sectional view of the motorcycle lamp of FIG. 7 in a horizontal plane.

A lens 40, in particular a converging lens, may be disposed on a light source 10 configured as an LED (cf. FIGS. 4 and 9) to reduce the angle of radiation of the emitted light, for instance to approximately 80° (+/−40° to both sides of the main radiation direction 14; cf. FIG. 9). If the motorcycle lamp 2 has more than one light source 10, as stated, a single joint front optics 12 provides the desired deflection and shaping of the light passing through the light sources 10 to achieve the desired lamp function(s). Preferably, the front optics 12 is designed such that the light emitted by different light sources 10 and coupled into the front optics 12 serves to generate different luminous functions after exiting the front optics 12. In particular, it is proposed that the front optics 12 have a separate light-entrance area 20 for every light source 10. The light-entrance areas 20 can be designed in different ways. For instance, the light-entrance surfaces 24 of the various light-entrance areas 20 can have different distances from the light-emitting surfaces of the light sources 10 respectively assigned thereto. Furthermore, it is conceivable that the light entrance collars 26 of the various light-entrance areas 20 do not extend across the entire perimeter of the associated recesses 22, but only across part of the perimeter of the recesses 22. The light entrance collars 26 of the various light-entrance areas 20 may be contiguous and complementary to form a single light entrance collar that encompasses the periphery of all light sources 10 of the lamp 2. It is also conceivable—as mentioned above—that the individual light sources 10 are assigned to converging lenses 40 such that the light emitted by the light sources 10 is first bundled before it falls on the assigned light-entrance areas 20 of the front optics 12. In this way, it can be achieved that at least approximately all the light emitted by the light sources 10 enters the front optics 12 through the respective assigned light-entrance surfaces 24 (and not through the light entrance collars 26).

To use the front optics 12 to close the light-emission aperture 6, the front optics 12 are preferably disposed in or on the light-emission aperture 6 and mounted on the housing 4. It can be attached, for instance, by means of screws, a thread, a snap-on fastener, gluing or welding. A seal (not shown) may be provided between a rim of the light-emission aperture 6 and the front optics 12. Preferably, the front optics 12 is bonded inside or onto the light-emission aperture 6, wherein the adhesive can simultaneously serve as a seal between the front optics 12 and the rim of the light-emission aperture 6 of the housing 4. Particularly preferably, the adhesive used comprises an MS polymer (modified silane). The adhesive is also used to compensate for manufacturing tolerances of the front optics 12 and/or of the housing 4 to always ensure the same high-precision positioning and attachment in a dust- and moisture-proof manner of the front optics 12 on the light-emission aperture 6.

In the exemplary embodiments of FIGS. 5-9, the light-emission surface 16 of the front optics 12 are flush with a rim 52 of the housing 4 delimiting the light-emission aperture 6 when the light-emission aperture 6 is closed by the front optics 12 (cf. FIG. 8). I.e., the light-emission surface 16 of the front optics 12 merges into the housing 4 of the lamp 2 without any shoulders or edges. In particular, the light-emission surface 6 does not protrude beyond the rim 52 of the housing 4 delimiting the light-emission aperture 6. Rather, the light-emission surface 16 of the transparent front optics 12, in conjunction with the outer surfaces of the housing 4, defines the outer shape of the part of the lamp 2 visible from the outside when the motorcycle lamp 2 is mounted on the motorcycle.

Particularly preferably, the housing 4 has a circumferential rim 52 delimiting the light-emission aperture 6, the front optics 12 has a circumferential collar 54 projecting radially outwards, and the rim 52 and the collar 54 have bearing surfaces facing each other, which the front optics 12 uses to rest on the housing 4 (cf. FIG. 8). An adhesive may be placed between the bearing surfaces such that the front optics 12 is also mounted on the housing through the bearing surfaces. The rim 52 delimiting the light-emission aperture 6 is preferably an upper rim of the side walls 48 of the 4 housing. The bearing surface of the front optics 12 is located on a bottom end of the collar 54, and the bearing surface of the housing 4 is located on a top end of the rim 52. The collar 54 of the front optics 12 is set on the rim 52 of the housing 4 and mounted thereon. In this case, a large part of the front optics 12 extends through the light-emission aperture 6 into the interior of the housing 4.

Preferably, the bearing surfaces of the circumferential rim 52 of the housing 4 and the circumferential collar 54 of the front optics 12 are beveled to complement each other, such that the bearing surface of the circumferential rim 52 has a cone-like shape and the circumferential collar 54 tapers outwards.

The at least one light source 10 is disposed on the printed circuit board 34 and electrically contacted through the latter. The end of the printed circuit board 34 facing away from the at least one light source 10 rests on a support area 56 of the housing 4 in a z-direction in parallel to the main radiation direction 14 of the at least one light source 10 (cf. FIG. 9). The printed circuit board 34 is mounted in the housing 4. The printed circuit board 34 with the light sources 10 mounted thereon is thus positioned with high precision in the z-direction in relation to the housing 4. Because the front optics 12 is positioned with high precision in the z-direction in relation to the housing 4 via the bearing surfaces of the rim 52 of the housing 4 and the collar 54 of the front optics 12, a highly accurate positioning of the front optics 12 results with respect to the light sources 10 in the z-direction.

The printed circuit board 34 can be mounted on the housing 4 using screws, a snap-on fastener, a thread, gluing or welding. Preferably, an adhesive 58 is used, in particular a thermoconducting adhesive, to transfer the waste heat generated during the operation of the at least one light source 10 to the housing 4 as efficiently as possible. The thermo-conducting adhesive (thermic glue) can be epoxy resin-based and/or contain silver particles. The housing 4 or the bracket 8 serve as a heat sink or heat dissipator for the at least one light source 10 and—if present—other electrical components 36, 38 disposed on the circuit board 34. Preferably, the printed circuit board 34 and—if present—the other electrical components 36, 38 disposed on the printed circuit board 34 are encapsulated by the adhesive 58. Particularly preferably, a cavity between the underside of the printed circuit board 34 and the housing 4 is at least partially filled with the adhesive 58. A cavity between the light sources 10 and the housing 4 may also be at least partially filled with the adhesive 58.

It is further proposed that locking pins engaging in corresponding locking holes in the printed circuit board 34 are used to position the front optics 12 in an xy-plane perpendicular to the main radiation direction 14 of the at least one light source 10, with respect to the printed circuit board 34. The front optics 34 are thus positioned with high precision in the xy plane with respect to the light sources 10 mounted on the printed circuit board 34.

Figure 5:
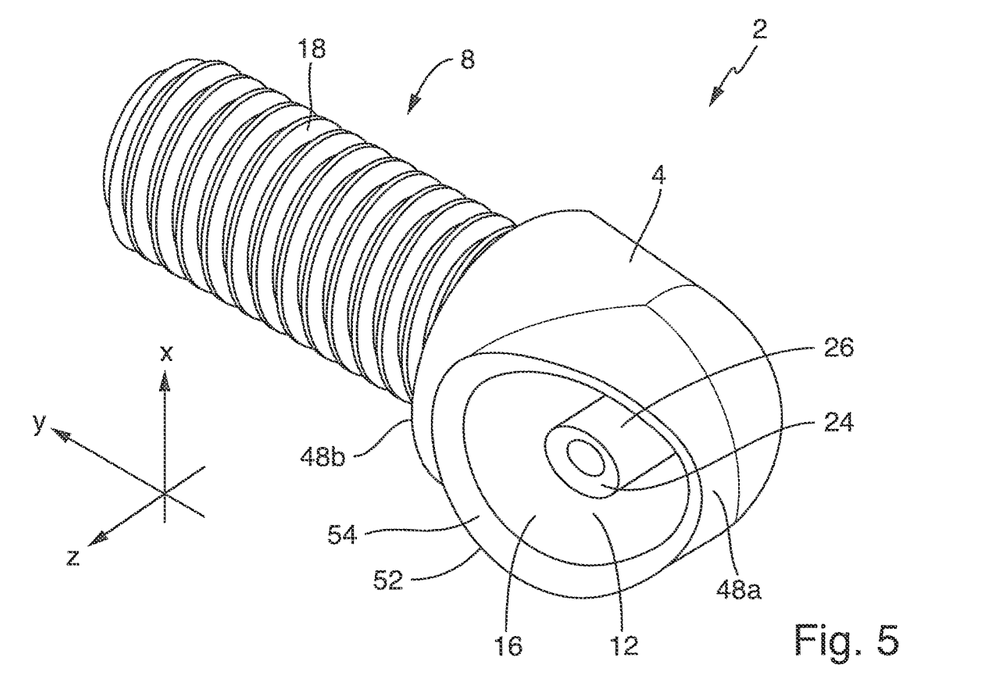
FIG. 5 shows a perspective view of a second embodiment of a motorcycle lamp according to the invention.
Figure 6:
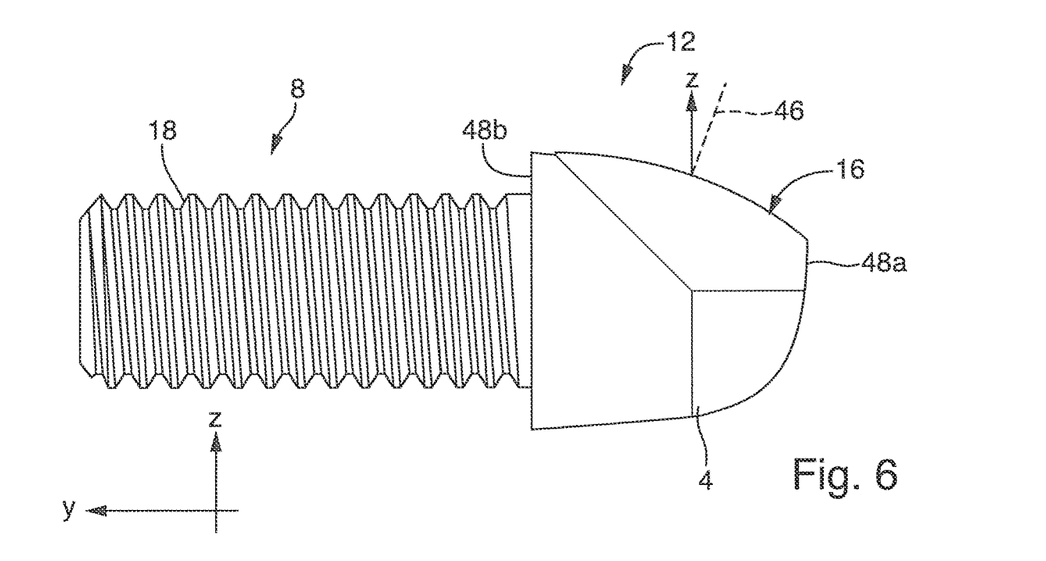
FIG. 6 shows a top view of the motorcycle lamp of FIG. 5.
Figure 7:
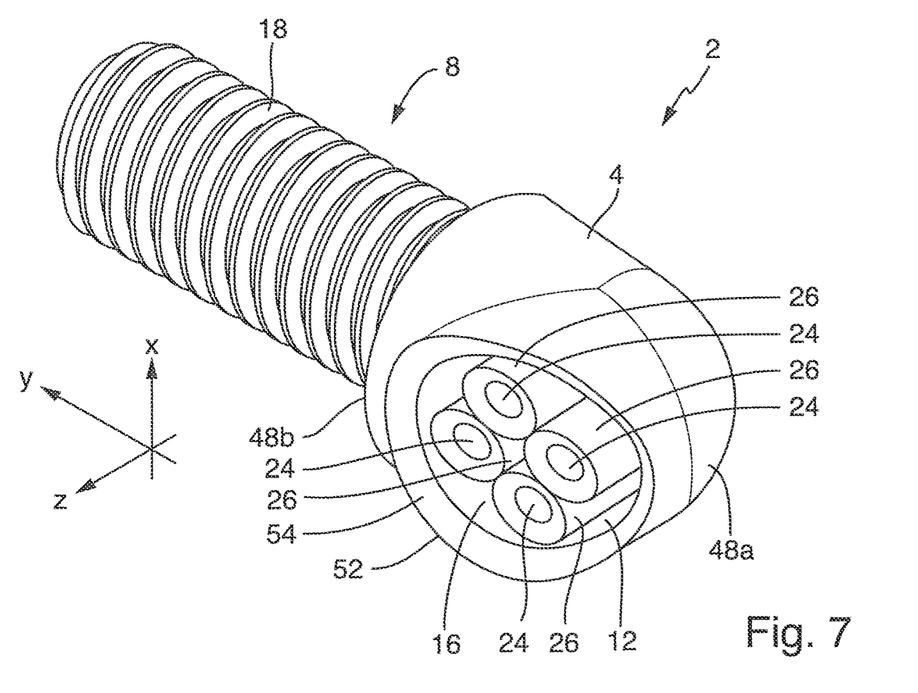
FIG. 7 shows a perspective view of a third embodiment of a motorcycle lamp according to the invention.

The exemplary embodiment of FIGS. 5 and 8 has only one light source 10 for generating a single lamp function, e.g. a flashing light or a marker lamp or a taillight or a brake light. The exemplary embodiment of FIGS. 6 and 9, on the other hand, has a total of four light sources 10, wherein two light sources 10 each serve to generate a lamp function. The lamp 2 according to FIGS. 6 and 9, for instance, can be used to implement a marker lamp and a direction-indicator lamp or a rear position lamp and a direction-indicator lamp or a rear position lamp and a stop lamp. It would also be conceivable to create a third lamp function by operating one or more of the light sources 10 at a higher or lower current. Thus, by increasing the operating current, the light sources 10 for generating the taillight could generate a brake light. Of course, it would also be conceivable to use one of each of two light sources 10 and the two remaining light sources 10 in conjunction to generate one lamp function each. In this way, the two individual light sources 10 could generate, for instance, a flashing light and a taillight, and the two remaining light sources 10 could generate a brake light.

The invention claimed is:

1. Motorbike signal lamp for realizing at least one signal light function, the motorbike signal lamp comprising
    a housing with a light emitting opening,
    a holder arrangement attached to or making part of the housing for fastening the motorbike signal lamp to a motorbike,
    at least one light source arranged in the housing, and
    a primary optics made of a solid transparent material arranged between the at least one light source and the light emitting opening,
    wherein the at least one light source comprises an LED and is arranged and aligned in the housing in such a way that it emits light in a main emission direction extending through the light emitting opening,
    wherein the primary optics closes the light emitting opening and deflects and shapes the light emitted by the at least one light source to produce a light distribution corresponding to a signal light function realised by the motorbike signal lamp, and
    wherein a light emitting surface of the primary optics, viewed in a horizontal plane passing through the at least one light source or one light source of a plurality of the light sources and comprising the main emission direction of the at least one light source, has a first convex curvature, and viewed in a vertical plane passing through the at least one light source or one light source of the plurality of light sources and comprising the main emission direction of the at least one light source, has a second convex curvature which is smaller than the first convex curvature in the horizontal plane, or is flat.

2. Motorbike signal lamp according to claim 1, wherein the light emitting surface of the primary optics is inclined with respect to a plane extending perpendicular to the main emission direction of the at least one light source or one light source of the plurality of light sources, as viewed in the horizontal plane.

3. Motorbike signal lamp according to claim 2, wherein the light emitting surface of the primary optics is inclined with respect to the plane which runs perpendicular to the main emission direction of the at least one light source or one light source of the plurality of light sources, as viewed in the horizontal plane, in a direction which is directed away from the motorbike when the motorbike signal lamp is mounted on a motorbike.

4. Motorbike signal lamp according to claim 2, wherein
    the housing has a circumferential edge delimiting the light emitting opening,
    the primary optics has a circumferential collar projecting radially outwards, and
    the circumferential edge and the circumferential collar have corresponding bearing surfaces facing one another, by means of which the primary optics is fastened to the housing with the circumferential collar extending radially beyond the light emitting opening.

5. Motorbike signal lamp according to claim 1, wherein the holder arrangement is fixed laterally to the housing as viewed in the horizontal plane, and in that the light emitting surface of the primary optics is inclined away from the holder arrangement as viewed in the horizontal plane.

6. Motorbike signal lamp according to claim 1, wherein the housing has side walls which delimit an inside space of the housing to the side and the light emitting opening, wherein, when the motorbike signal lamp is mounted on a motorbike, a side wall directed away from the motorbike or a part of a side wall directed away from the motorbike has a lower height than an opposite side wall or an opposite part of a side wall.

7. Motorbike signal lamp according to claim 1, wherein the housing has side walls which delimit an inside space of the housing to the side and the light emitting opening, in that the holder arrangement is fastened laterally to the housing as viewed in the horizontal plane, and in that a side wall directed away from the holder arrangement or a part of a side wall directed away from the holder arrangement has a lower height than an opposite side wall or an opposite part of a side wall.

8. Motorbike signal lamp according to claim 1, wherein the motorbike signal lamp has the plurality of light sources for realizing a plurality of different signal light functions, each of the plurality of light sources realizes one of the plurality of different signal light functions.

9. Motorbike signal lamp according to claim 8, wherein the plurality of different signal light functions of the motorbike signal lamp comprise one of the following:
    a direction indicator and a position light, or
    a tail light and a brake light, or
    a direction indicator, a tail light and a brake light.

10. Motorbike signal lamp according to claim 9, wherein
    the primary optics is arranged between the plurality of light sources and the light emitting opening, and
    the primary optics deflects and shapes the light emitted by each of the plurality of light sources to produce light distributions of a respective one of the plurality of different signal light functions.

11. Motorbike signal lamp according to claim 9, wherein at least two of the plurality of light sources emit light of different colours.

12. Motorbike signal lamp according to claim 8, wherein
    the primary optics is arranged between the plurality of light sources and the light emitting opening, and
    the primary optics deflects and shapes the light emitted by each of the plurality of light sources to produce light distributions of a respective one of the plurality of different signal light functions.

13. Motorbike signal lamp according to claim 12, wherein at least two of the plurality of light sources emit light of different colours.

14. Motorbike signal lamp according to claim 8, wherein at least two of the plurality of light sources emit light of different colours.

15. Motorbike signal lamp according to claim 1, wherein the light emitting surface of the primary optics is flush with an edge of the housing defining the light emitting opening, when the light emitting opening is closed by the primary optics.

16. Motorbike signal lamp according to claim 1, wherein
- the housing has a circumferential edge delimiting the light emitting opening,
- the primary optics has a circumferential collar projecting radially outwards, and
- the circumferential edge and the circumferential collar have corresponding bearing surfaces facing one another, by means of which the primary optics is fastened to the housing with the circumferential collar extending radially beyond the light emitting opening.

17. Motorbike signal lamp according to claim 16, wherein the corresponding bearing surfaces of the circumferential edge of the housing and the circumferential collar of the primary optics are correspondingly bevelled with respect to one another, so that a bearing surface of the circumferential edge of the housing has a cone-like shape and the circumferential collar of the primary optics tapers radially outwards.

18. Motorbike signal lamp according to claim 1, wherein
- the at least one light source is arranged on a printed circuit board and is electrically contacted via the printed circuit board, and
- the printed circuit board rests in a direction parallel to the main emission direction of the at least one light source with its surface facing away from the at least one light source on a support region in an inside space of the housing and is fastened to the housing.

19. Motorbike signal lamp according to claim 18, wherein the primary optics is positioned in a plane perpendicular to the main emission direction of the at least one light source with respect to the printed circuit board by locking pins which engage in corresponding locking openings of the printed circuit board.

20. Motorbike signal lamp according to claim 1, wherein, when the holder arrangement of the motorbike signal lamp is mounted on the motorbike, the primary optics is oriented perpendicular to a vertical longitudinal plane of the motorbike, the vertical longitudinal plane of the motorbike passing through wheels of the motorbike and perpendicular to axes of rotation of the wheels, and the vertical plane passing through the at least one light source or one light source of a plurality of the light sources extending parallel to the vertical longitudinal plane of the motorbike.

* * * * *